United States Patent [19]

Wolff et al.

[11] Patent Number: 5,745,341
[45] Date of Patent: Apr. 28, 1998

[54] INCLINED DOCKING BASE FOR A PORTABLE COMPUTER WITH A SLIDABLE MONITOR SUPPORT MEMBER

[75] Inventors: Stacy L. Wolff; Wayne T. Brezovar, both of Houston, Tex.

[73] Assignee: Compaq Computer Corporation, Houston, Tex.

[21] Appl. No.: 775,616

[22] Filed: Dec. 31, 1996

[51] Int. Cl.⁶ .............................. G06F 1/16; H05K 7/10
[52] U.S. Cl. ........................ 361/682; 361/686; 248/917
[58] Field of Search .................................... 361/684, 685, 361/683, 686, 724, 725, 727, 680, 681, 682; D14/100, 107; 248/917–923; 364/708.1; 312/223.1, 223.2

[56] References Cited

U.S. PATENT DOCUMENTS

| | | | |
|---|---|---|---|
| D. 306,433 | 3/1990 | Mitchell | D14/106 |
| D. 320,196 | 9/1991 | Carter et al. | D14/107 |
| D. 335,490 | 5/1993 | Mesfin et al. | D14/107 |
| D. 356,782 | 3/1995 | Leman | D14/107 |
| D. 361,758 | 8/1995 | Youens et al. | D14/107 |
| D. 366,468 | 1/1996 | Ryan et al. | D14/107 |
| D. 366,469 | 1/1996 | Youens | D14/107 |
| D. 367,360 | 2/1996 | Wolff | D3/323 |
| D. 370,795 | 6/1996 | Skov et al. | D6/420 |
| 4,769,764 | 9/1988 | Levanon | 364/708 |
| 4,903,222 | 2/1990 | Carter et al. | 364/708 |
| 5,030,128 | 7/1991 | Herron et al. | 439/372 |
| 5,158,184 | 10/1992 | Craft et al. | 211/41 |
| 5,162,719 | 11/1992 | Tomura et al. | 320/2 |
| 5,182,698 | 1/1993 | Kobayashi et al. | 361/395 |
| 5,199,888 | 4/1993 | Condra et al. | 439/142 |
| 5,208,736 | 5/1993 | Crooks et al. | 361/393 |
| 5,310,358 | 5/1994 | Johnson et al. | 439/358 |
| 5,323,291 | 6/1994 | Boyle et al. | 361/683 |
| 5,323,924 | 6/1994 | Wolff | 220/410 |
| 5,347,425 | 9/1994 | Herron et al. | 361/683 |
| 5,351,730 | 10/1994 | Lewellen et al. | 144/286 R |
| 5,358,100 | 10/1994 | Wolff | 206/45.11 |
| 5,370,453 | 12/1994 | Wolff | 312/217 |
| 5,384,686 | 1/1995 | Mesfin et al. | 361/686 |
| 5,394,552 | 2/1995 | Shirota | 395/750 |
| 5,436,792 | 7/1995 | Leman et al. | 361/686 |
| 5,488,572 | 1/1996 | Belmont | 364/514 R |
| 5,507,385 | 4/1996 | Koloski et al. | 206/372 |
| 5,568,359 | 10/1996 | Cavello et al. | 361/686 |

FOREIGN PATENT DOCUMENTS

| | | | |
|---|---|---|---|
| 5-250067 | 9/1993 | Japan | G06F 1/16 |
| 5-250067A | 9/1993 | Japan | G06F 1/16 |
| 0 429 780 A3 | 6/1991 | United Kingdom | G06F 1/26 |

OTHER PUBLICATIONS

Compaq Smartstation Installation & Operations Guide; Compaq LTE Elite Family of Personal computers and Compaq LTE Lite Family of Personal Computers; ©1994 Compaq Computer Corporation Bates Nos. 1 to 168. In particular, see pp. 3–1 to 3–11; 4–1 to 4–21; 5–3 to 5–5 and B–1.

*Primary Examiner*—Lynn D. Feild
*Attorney, Agent, or Firm*—Pravel, Hewitt, Kimball & Krieger

[57] ABSTRACT

An inclined docking base having slides, positioned outboard of the docked portable computer, to guide respective legs of a monitor support member from an initial slide position to a desktop operation position. Blocking surfaces and slide walls at the front end of each slide in combination with the respective legs align the coupling members on the support member and the docking base. A method for quick installation and removal of the support member relative to the docking base is disclosed.

20 Claims, 7 Drawing Sheets

INCLINED DOCKING BASE FOR A PORTABLE COMPUTER WITH A SLIDABLE MONITOR SUPPORT MEMBER

SPECIFICATION

1. Field of the Invention

This invention relates to computer systems. More particularly, the present invention relates to an inclined docking base for a portable computer with a slidable monitor support member and a method for installation and removal of the support member.

2. Background of the Invention

Bases have been used in the past for docking portable computers. Portable computer that could be used with the present invention are disclosed in U.S. Ser. No. 08/609,297 filed Mar. 4, 1996, and U.S. Pat. No. 5,208,736. The term docking base, as used herein, is a general term used to describe both an expansion base and a convenience base. An expansion base, such as shown in U.S. Pat. No. 5,384,686, is distinguished from a convenience base, such as shown in U.S. Pat. No. 5,627,450, in that the convenience base docks a portable computer, without capabilities to receive floppy disks, card and drives.

Some of the docking bases used in the past have a horizontal top surface for receiving the portable computer, such as disclosed in U.S. Pat. Nos. 4,903,222 (FIG. 1); 5,488,572 (FIG. 1); Des. 320,196 (FIGS. 1–8). Some docking bases have an inclined top surface, such as disclosed in U.S. Pat. No. Des. 361,758 (FIGS. 4 and 5), and some docking bases are even tiltable so that the top surface can be moved between a horizontal position and an inclined position, such as disclosed in U.S. Pat. No. Des. 356,782 (FIG. 9), U.S. Pat. No. 5,627,450, and U.S. Pat. No. Des. 366,468.

It has also been known in the past to provide a removable support member on top of a docking base having a horizontal top surface to receive the portable computer, so that a monitor could be placed on the support member, such as proposed in U.S. Pat. No. 5,199,888 (FIGS. 1 and 3); U.S. Pat. No. 5,323,291 (FIGS. 5–7); U.S. Pat. No. 5,347,425 (FIGS. 5–7); U.S. Pat. No. 5,384,686 (FIGS. 1, 2, 4–10); and U.S. Pat. No. Des. 335,490 (FIGS. 1–9). It has also been known to provide a removable monitor support member with a docking base having a horizontal top surface to receive the portable computer that provides access to the sides of the portable computer, when docked, such as shown in U.S. Pat. No. Des. 366,469 (FIGS. 9–14); and Compaq "SmartStation" Installation & Operations Guide, pp. 3–9, 3–10, 4—4, 4–7, and 4–16.

U.S. Pat. Nos. 4,903,222; 5,199,888; 5,208,736; 5,384,686; 5,488,572; Des. 320,196; Des. 335,490; Des. 356,782; Des. 361,758; Des. 366,468; and Des. 366,469 are assigned to the assignee of the present invention and are incorporated herein for all purposes.

The inclined top surface of the prior art docking bases have been found desirable because the keyboard section of the portable computer, when positioned on the docking base, is inclined for a more ergonomic typing position.

Therefore, in the past, in order to have a horizontal flat surface on the top of the support member, the top surface of the docking base was also substantially parallel to the surface on which the docking base was placed. For example, in U.S. Pat. No. 5,384,686, the portable computer is received on a horizontal flat surface of the base and the cover or platform portion 16 provides a horizontal flat surface upon which the base of monitor 14 rests, in normal desktop operation of the system, as shown in FIG. 1. As can be seen in FIG. 2 of the '686 patent, the cover 16 has sidewalls 28 which rest upon upstanding shoulders 31 provided on each side and near the front of the top of the expansion base. As can be seen in FIGS. 5 and 7 of the '686 patent, the ribbed openings 34 and 36 located at the sides and near the front of the bottom of the cover are positioned with the upstanding lands 30 atop each shoulder 31 to position the cover against rearward and sideward motion. Forward motion of the cover when in place is prevented by the small tabs 38 (FIGS. 4 and 9) extending downwardly at the rear of the cover, which snap into position just behind and against the rear surface of the base. (See '686 patent, col. 5, lns 7–24).

Both the '686 patent (col. 7, lns 13–16); and U.S. Pat. No. Des. 366,469 (FIGS. 1–3) in combination with the Compaq "SmartStation" Installation & Operations Guide p. 4–5 propose the use of a tilt-up display section of the portable computer with docking bases having monitor support members. Of course, this use of the display section of the portable computer requires the installation and removal of the support member and the external monitor, when desired.

In summary, it would be desirable to have a docking base with an inclined top surface that facilitates quick installation and removal of a monitor support member. Moreover, an inclined self aligning docking base and monitor support member system that uses the force of gravity to position and engage the support member with the docking base while providing access to the sides of the portable computer, when docked, would be desirable.

SUMMARY OF THE INVENTION

An inclined docking base having slides, positioned outboard of the sides of a docked portable computer, guide respective legs of a monitor support member from an initial slide position to a desktop operation position to facilitate coupling of the support member with the base. The blocking surfaces at the front end of each slide and slide walls on each side of the slide in combination with respective legs assist in alignment of coupling members to couple the support member with the base. The blocking surfaces, slide walls, legs and the coupling members on the support member and base resist movement of the support member relative to the base. When positioned on the support member, a monitor enhances this resistance. Advantageously, a method for quick installation and removal of the support member relative to the docking base is disclosed.

BRIEF DESCRIPTION OF THE DRAWINGS

The objects, advantages and features of the invention will become more apparent by reference to the drawings which are appended hereto, wherein like numerals indicate like parts and wherein an illustrated embodiment of the invention is shown, of which.

DETAILED DESCRIPTION OF INVENTION

The preferred embodiment of the inclined docking base and slidable monitor support member of the present invention is shown in FIGS. 1-14 of the drawings. The preferred embodiment of the docking base is a convenience base, though the present invention could be used for other docking bases, such as an expansion base, that would include floppy disk, cards and drives. Additionally, the preferred embodiment of the present invention would include a subnotebook computer such as disclosed in U.S. Ser. No. 08/609,297, but notebook computers, such as disclosed in U.S. Pat. No. 5,208,736 could be used with the present invention.

Figure 1:
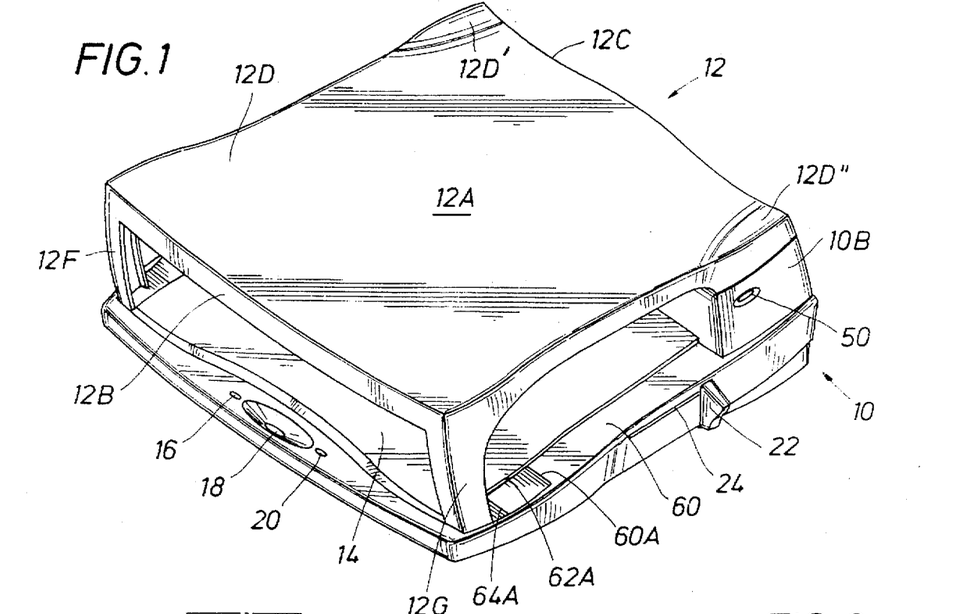
FIG. 1 is a perspective view of the preferred embodiment of the docking base and support member of the present invention in the desktop operation position.
Figure 2:
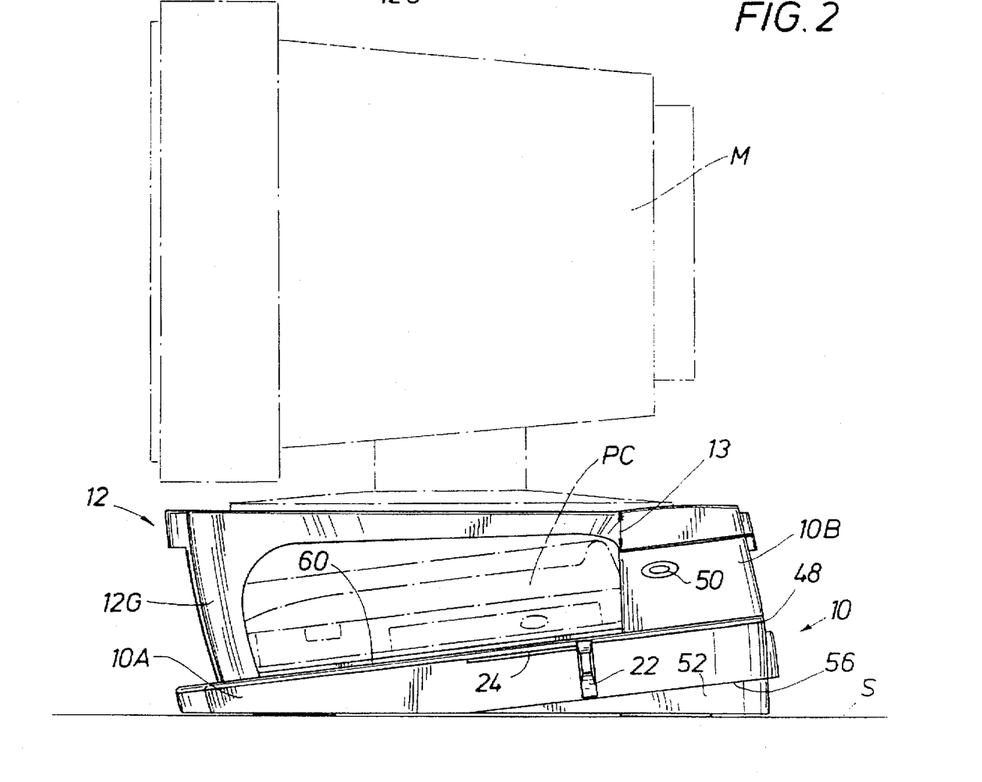
FIG. 2 is a side view of the preferred embodiment of the docking base and support member of the present invention, as shown in FIG. 1, with a docked portable computer and an external monitor shown in phantom view.

Turning to FIGS. 1 and 2, the convenience base, generally indicated at 10, is inclined relative to the horizontal surface S upon which it is positioned, as will be discussed below in detail. While the preferred base is inclined in a fixed position, the base could be tiltable as proposed in U.S. Pat. No. 5,627,450 and U.S. Pat. No. Des. 366,468, but to achieve the horizontal flat surface on the top of the support member, the tiltable base should only be used in the inclined position.

Figure 3:
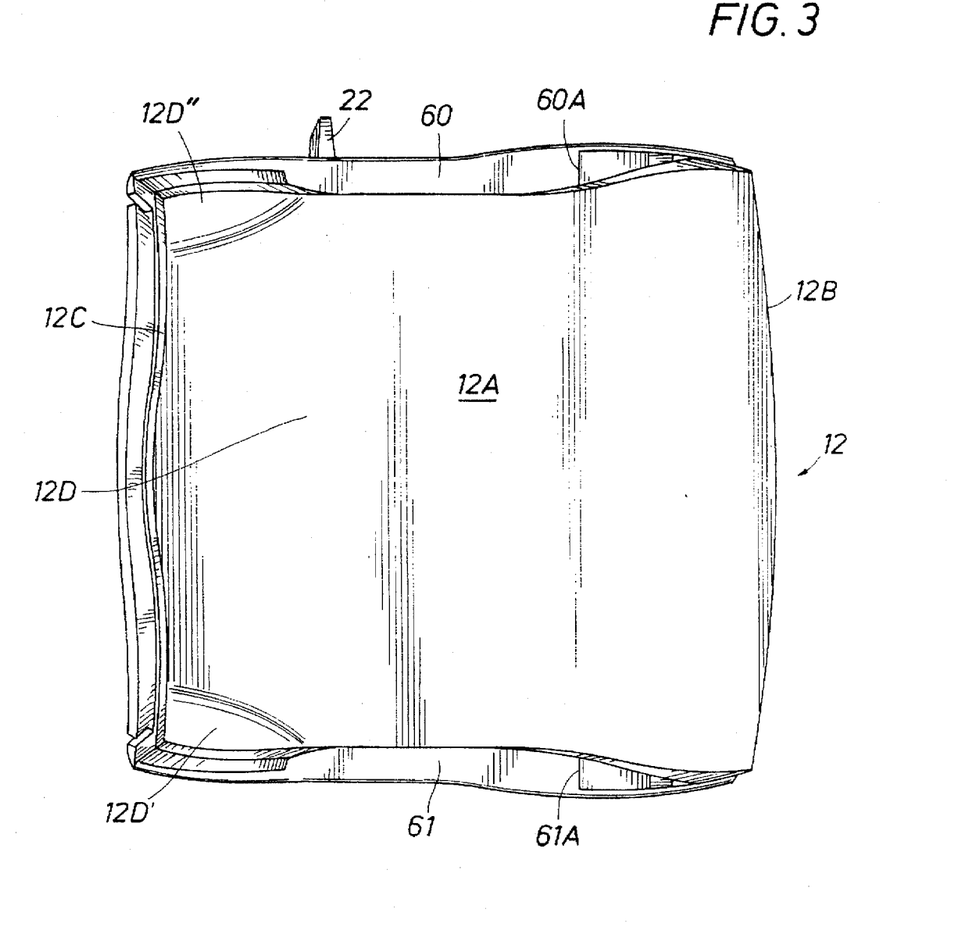
FIG. 3 is a plan view of the preferred embodiment of the docking base and support member of the present invention.
Figure 4:
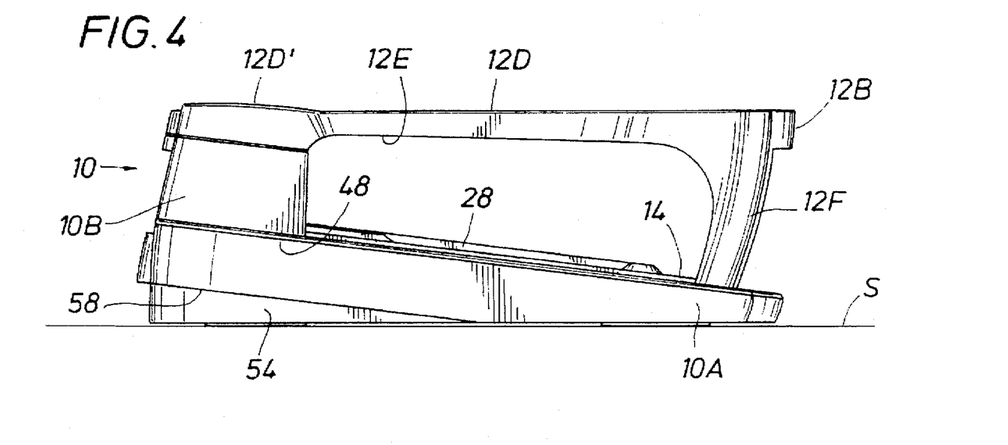
FIG. 4 is the other side view of the preferred embodiment of the docking base and support member of the present invention.
Figure 14:
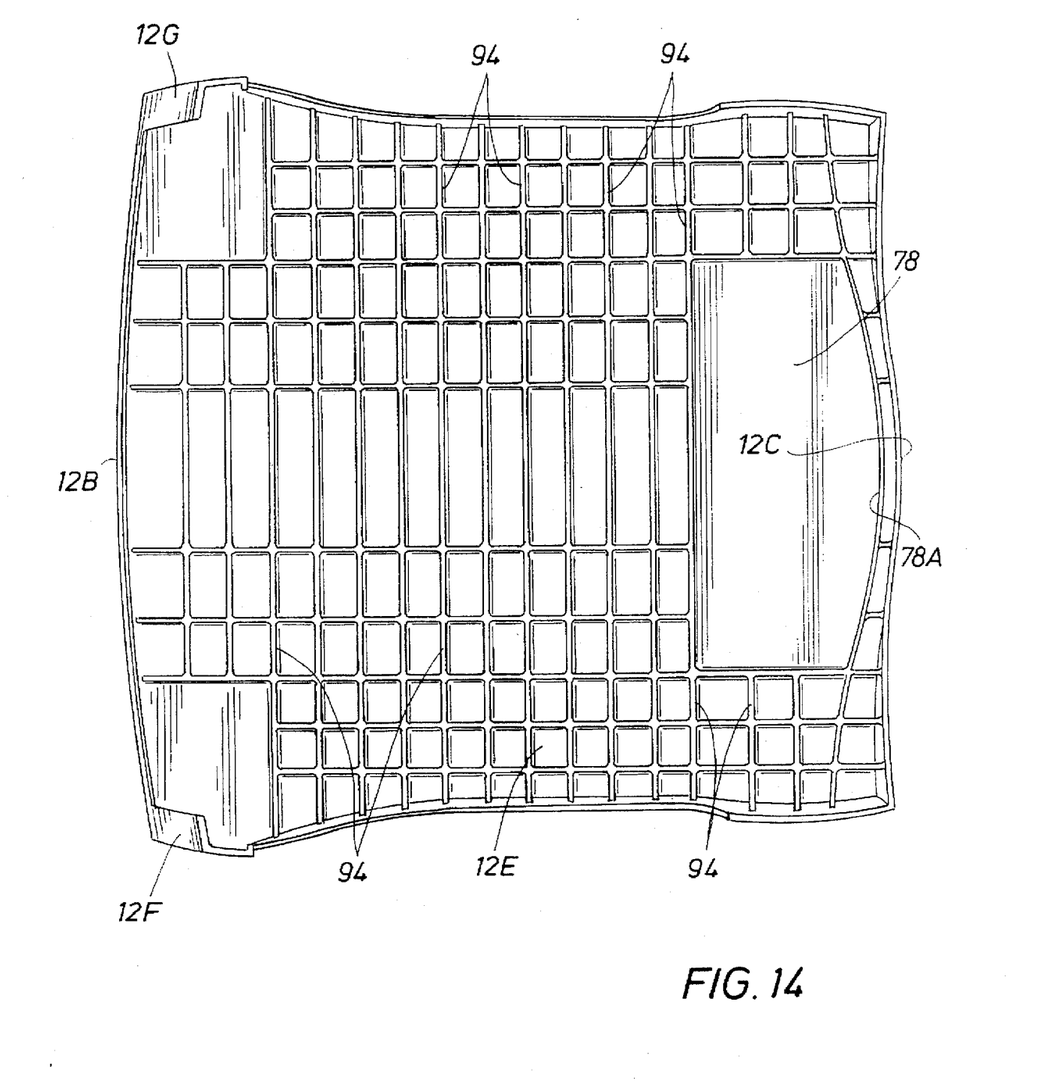
FIG. 14 is a section view taken along line 14—14 of FIG. 8 illustrating the bottom view of the support member.

A support member, generally indicated at 12, includes a support body 12A having a front 12B, a back 12C, a top 12D and a bottom 12E, as best shown in Figs. The height of the body is approximately one inch at its largest height at 13, as shown in FIG. 2. Legs 12F and 12G extend downwardly from the bottom 12E of the main body 12A of the support member 12. Preferably, the legs extend approximately 3.5 inches from the bottom 12E of the support member 12. As best shown in FIGS. 12 and 14, the legs are C-shaped to provide structural stability to the legs for supporting the main body 12A of the support member 12, in addition to providing three surfaces to resist movement of the legs relative to the base 10, as will be discussed below. Additionally, the C-shaped legs, 12F and 12G, curve from the front to the back of the support member as they extend downwardly, as shown in FIGS. 2 and 4. The support member 12 along with the other design features of the preferred embodiment of the support member 12 and docking base 10, as best shown in FIGS. 1-14, provide an ornamental design for the present invention while achieving the functional and structural needs of the invention, as discussed below. Though the preferred base is inclined, the top 12D of the support member 12 provides a substantially horizontal flat surface that includes flared up side back members 12D', 12D" in the back corners.

Figure 5:
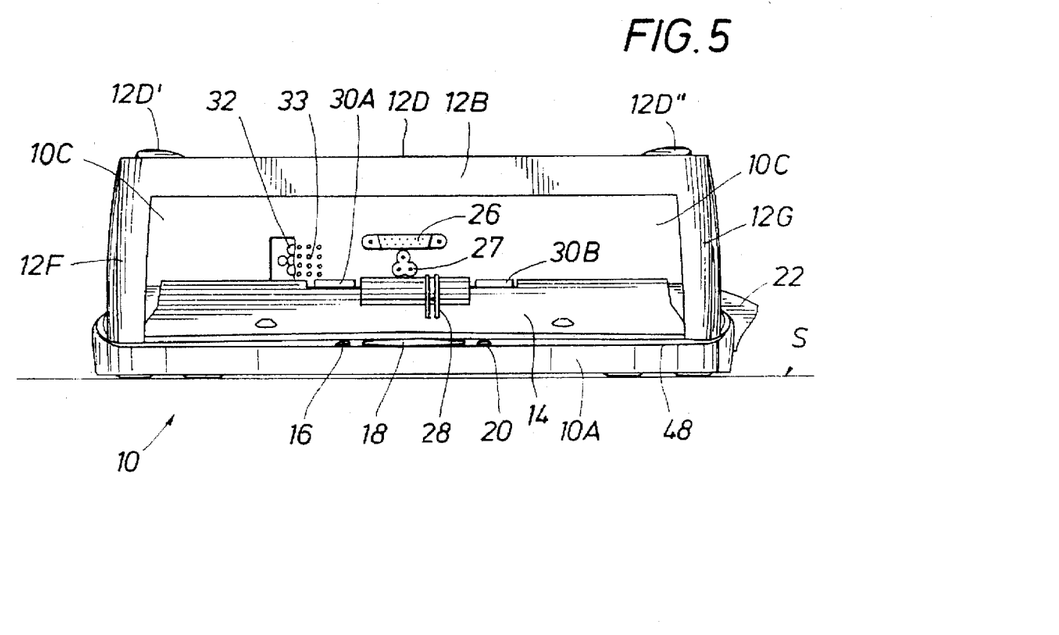
FIG. 5 is a front view of the preferred embodiment of the docking base and support member of the present invention with a portion of a vent in the base shoulder broken away to better illustrate the cooling fan.

As shown in FIGS. 1, 5, 6 and 11, the base 10 includes a front section 10A and a back section 10B, which are defined and separated by a shoulder 10C. The front section 10A includes a top surface 14 upon which a portable computer PC can be positioned, as best shown in FIG. 2. As shown in FIG. 1, the front section 10A of the base 10 includes openings to receive light indicators, such as power light indicator 16, "sleep" button indicator 18 and battery charger indicator light 20. Upon proper docking of the portable computer PC with the base 10, these indicators 16, 18 and 20 will be visible to the user, as can be seen in FIGS. 1 and 2. The base 10 also includes a manual actuator 22 that moves along the side, from the front to the back of the base, the distance of slot 24, to facilitate connection of the portable computer electrical connector (not shown) in the rear of the portable computer PC, such as shown in U.S. Pat. No. 5,199,888, with the connector 26 located in the shoulder 10C of the base 10, as best shown in FIG. 5. In particular, as best shown in FIG. 5, the bottom of the portable computer PC is positioned on tracks 28 on the top surface 14 of the front section 10A of the base 10 to align the portable computer PC. The portable computer is then moved rearwardly and upwardly on the incline so that the members 30A and 30B engage the bottom of the portable computer PC. The lever 22 is then moved from the front of the base rearwardly to facilitate and maintain connection of the connector of the portable computer with the connector 26 on the inclined base 10. An AC plug 27 also in the shoulder 10C is located below the connector 26 for power connection with the portable computer PC.

Also, to assist in the cooling of the portable computer when docked, the base 10 of the present invention preferably includes a fan 32 mounted internally the back section 10B of the base 10. The fan 32, located behind the vent 33, as best shown in FIG. 5, moves air from the area between the support member 12 and the base 10, where the portable computer PC is located, and out through the vent 34, as best shown in FIG. 6, in the back and bottom of the base 10 to assist in the cooling of the system.

Figure 6:
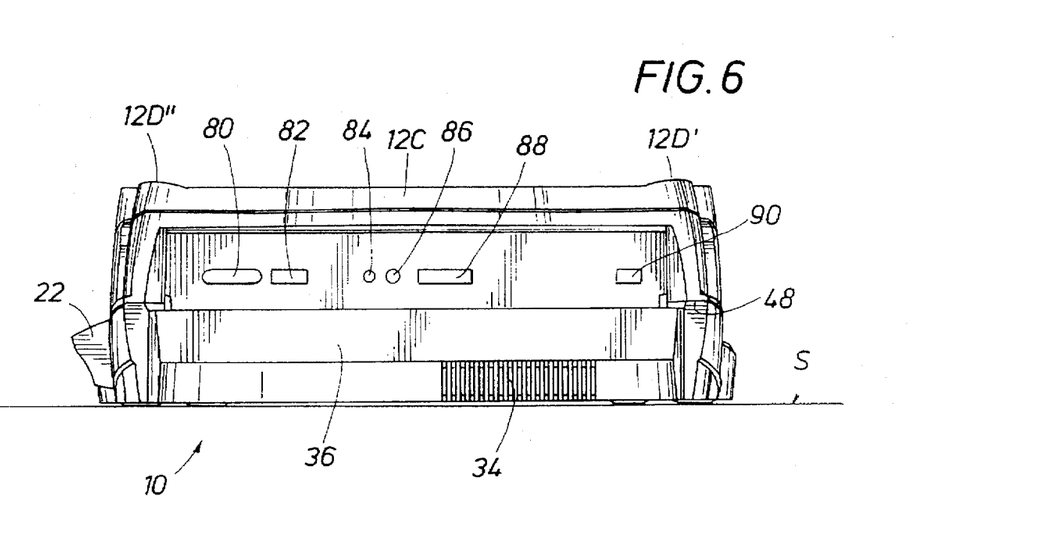
FIG. 6 is a back view of the preferred embodiment of the docking base and support member of the present invention.
Figure 7:
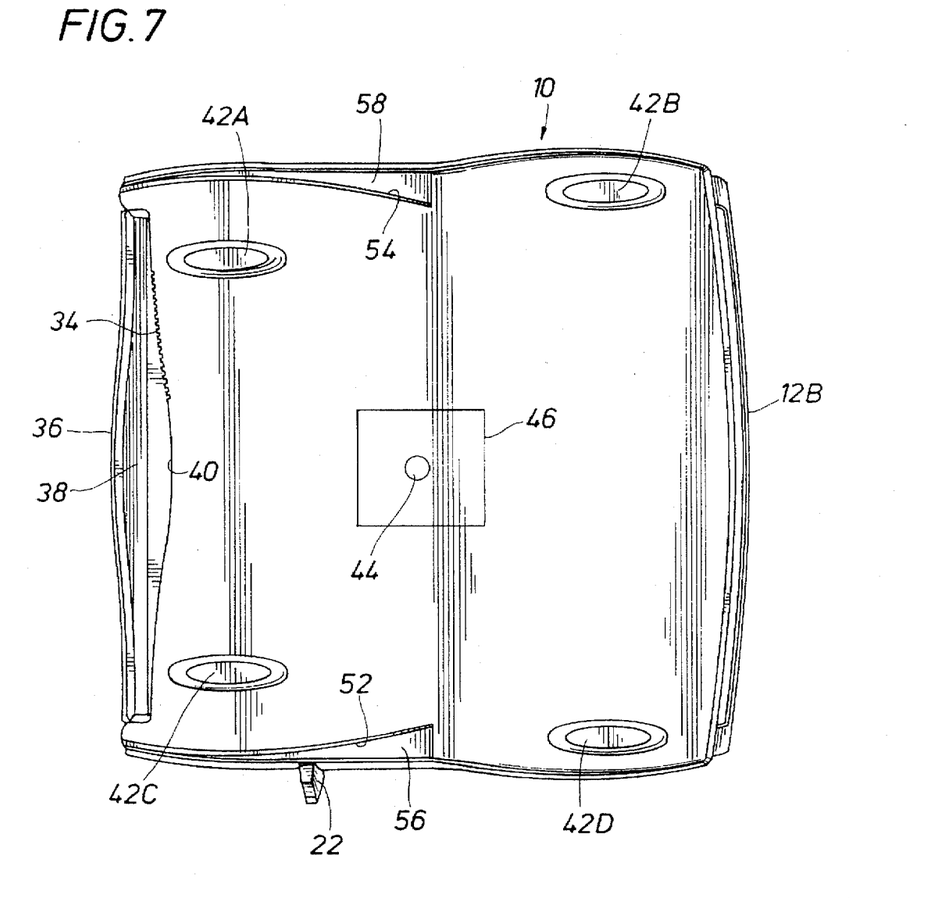
FIG. 7 is a bottom view of the preferred embodiment of the docking base and support member of the present invention.

As best shown in FIGS. 6 and 7, a handle grip 36 is provided by the opening 38 between the handle grip 36 and the back 40 of the base 10 to assist in the portability of the base 10, when the support member 12 and portable computer are removed. As best shown in FIG. 7, the bottom of the base 10 includes four oval shaped recesses 42A, 42B, 42C and 42D positioned adjacent the corners of the bottom of the base. Rubber footings (not shown) are preferably secured therein, such as by using adhesive. As best shown in FIGS. 7, the gate 44 resulting from injection of plastic into the mold for the base, is preferably covered by a label 46 slightly recessed so as to provide a flush surface with the bottom of the base 10 and a finished appearance. Preferable, the shell of the base 10 is injection molded into two components, defined by the line 48, as best shown in FIGS. 2, 4, 5 and 6. These two base components are attached together by a plurality of screws, preferably eleven screws, after the internals components are installed, such as fan 32 and the components for member 30A and 30B. The support member 12 is a unitary injection molded plastic component. Preferably, the shell of the base 10, the integrated support member 12, manual actuator 22 and switch 50 are fabricated only of plastic. The preferred plastic is PC/ABS 6200 manufactured by General Electric, Polymer Division of Pittsfield, Mass. Also, as shown in FIGS. 1 and 2, an opening is provided on the side of the back section 10B of the base 10 to receive a power switch 50 for turning the power for the electronics of the base on and off.

Additionally, as best shown in FIGS. 2, 4, 7, 8, 9 and 10, recessed lower surface 52 in the base 10 is preferably provided on the same side as the power switch 50, and recessed surface 54 is preferably provided on the other side of the base 10 to provide downwardly facing surfaces 56 and 58, respectively, which provide hand grips for lifting the base 10. Additionally, the recess surfaces 52 and 54 provide a slimming appearance to the base 10.

As can be seen in FIGS. 1 and 2, a slide 60 is provided outboard of the portable computer PC on the top surface 14 of the base 10. The slide 60 preferably begins at the shoulder 10C and inclines downwardly from the back towards the front of the front section 10A on the top surface 14. The slide 60 inclines at substantially the same angle of the incline of the top surface 14 of the front section 10A until a steeper incline begins at 60A, as best shown in FIGS. 11 and 12, and ends at the blocking surface 60B in the front section 10A of the base 10. Preferably, the angle of incline of slide 60 before 60A is 7 degrees to the horizontal surface S and the incline between 60A and surface 60B is approximately 12 degrees to the horizontal surface S.

Figure 8:
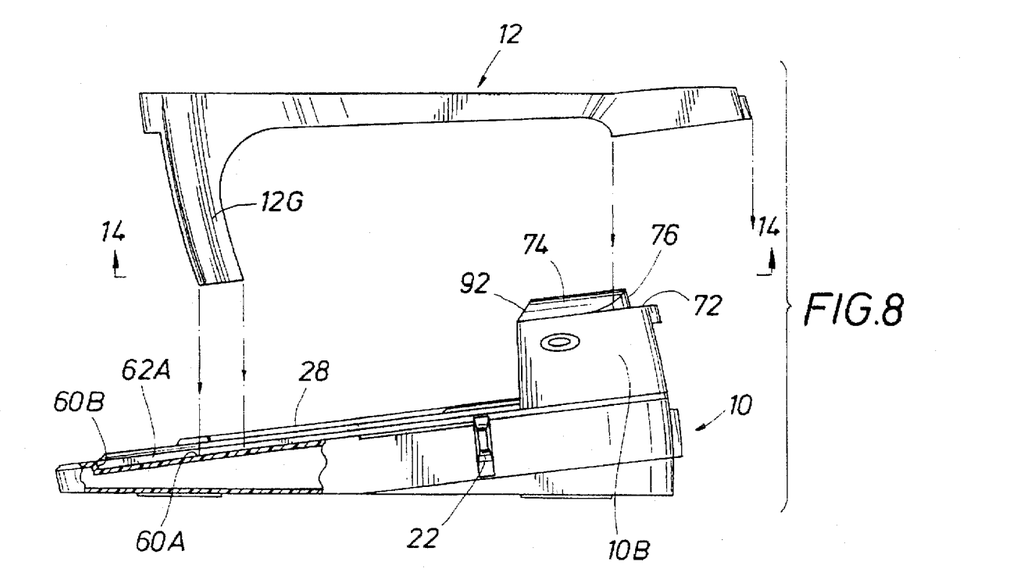
FIG. 8 is an exploded side view of the preferred embodiment of the docking base and support member of the present invention, with a portion of the front side of the docking base shown cut away.
Figure 9:
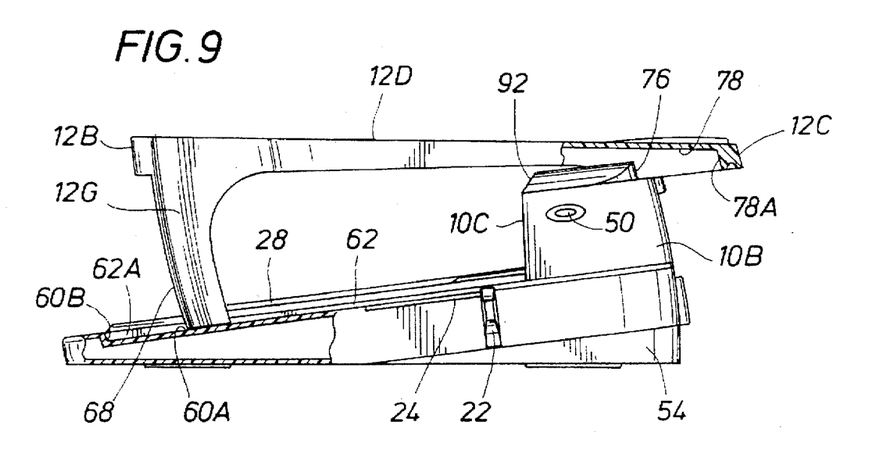
FIG. 9 is a view of the support member in the initial slide position, similar to FIG. 8, with the support member leg positioned on a slide of the docking base and back of the support member shown cut away to better illustrate the coupling members of both the support member and the docking base.

As best shown in FIGS. 8 and 9, when the support member 12 is placed in the initial sliding position, the front surface 68 of the leg 12G is located approximately at 60A. At 60A, the outwardly facing slide wall 62, which preferably extends from the shoulder 10C and becomes thicker at 60A, as the incline of the slide becomes steeper, until the wall 62 intersects with the blocking surface 60B or the end of the slide 60. This thicker outwardly facing slide wall, generally indicated at 62A, is best seen in FIGS. 8, 9, 10 and 13. Also, at 60A, an inwardly facing slide wall, generally indicated at 64, begins and becomes thicker until the slide wall 64 intersects with the blocking surface 60B or the end of the slide 60. As discussed above, the leg 12G includes an outwardly facing surface 66, a front surface 68, and a surface 70. The surfaces 66, 68 and 70 of the leg 12G are sized so as to enclosed by inwardly facing slide wall 64, the blocking surface 60B and the outwardly facing slide wall 62A, respectively. These walls 64, 62A and surface 60B enclose the leg 12G to resist forward and sideward motion of the leg. Preferably, as best seen in FIG. 11, the slide continually converges from one and one quarter inch in width adjacent to 60A to three quarters of an inch at 60B. This convergence assists in alignment and retainment of the legs with their respective slides. While rearward motion of leg 12G is possible, the weight of the support member 12 and any object placed thereon, such as a monitor M as shown in FIG. 2, will urge the front surface 68 of the leg 12G downwardly into engagement with the blocking surface 60B.

Similarly, though in a mirror image, the leg 12F is received on its slide 61 on the other side of the base 10 and outboard of the portable computer PC. As best shown in FIGS. 3 and 11, slide 61 becomes steeper at 61A and ends at blocking surface 61B.

Returning again to FIGS. 9 and 11, when the front surfaces of the legs 12G and 12F are placed on their initial slide positions 60A, 61A, the back of the support member 12 rests on the top surface 72 of the back section 10B of the base 10. As best shown in FIG. 11, a bell curved shaped coupling member 74 extends above the back section top surface 72 to present a rearwardly facing curved shoulder 76. This bell curved shaped coupling member 74 facilitates alignment of the back section 10B and the support member coupling member or recess 78, as best shown in FIG. 14, in the bottom of the support member 12, as the curved shoulder 76 facilitates alignment with the curved shaped shoulder 78A in the bottom of the support member 12. The height of the bell shaped coupling member from the top surface 72 at 73, preferably three eights of an inch, and the recessed support member coupling member, preferably one quarter of an inch, are sized so that upon positioning the support member 12 in the initial sliding position, the shoulder 76 clears any obstruction in the recess 78 in the bottom of the support member 12 until the shoulders 76 and 78A are engaged. Preferably, all the surfaces of the base and support member include a textured surface, such as a Mold-Tech MT-11020 provided by Mold-Tech, a division of Roehlen Industries, Inc., 3649 Conflans Road, Unit 102, Irving, Tex. 75061 (a Standex Company) to provide additional frictional engagement of the support member 12 with the base including the coupling members of the support member and back section 10B.

Turning now back to FIG. 6, the base 10 preferably includes a number of conventional connections such as a parallel device connection 80, a serial device connection 82, a PS/2 mouse connection 84, an external keyboard connection 86, an external monitor connection 88 and a power cord connection 90.

Additionally, as shown in the Figs., particularly FIG. 2, the openings created on both sides and front when the support member 12 is positioned on the base 10 allow larger access opening to the portable computer PC. In particular, these openings in the side provide access to the PCMCIA slots, and enhanced option slots of the portable computer, such as CD-ROM, floppies, batteries, audio port, volume control, and a RJ-11 phone jack.

Figure 10:
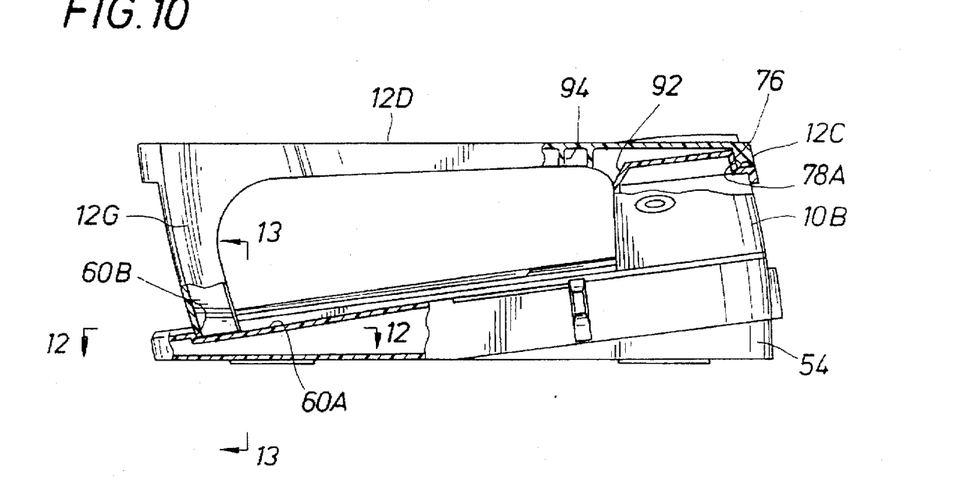
FIG. 10 is a view, similar to FIG. 2, with the end of the leg and the back of the support member, and portions of the back section and the front section of the base shown cut away to better illustrate the engagement of the support member and the base in the desktop operation position.
Figure 11:
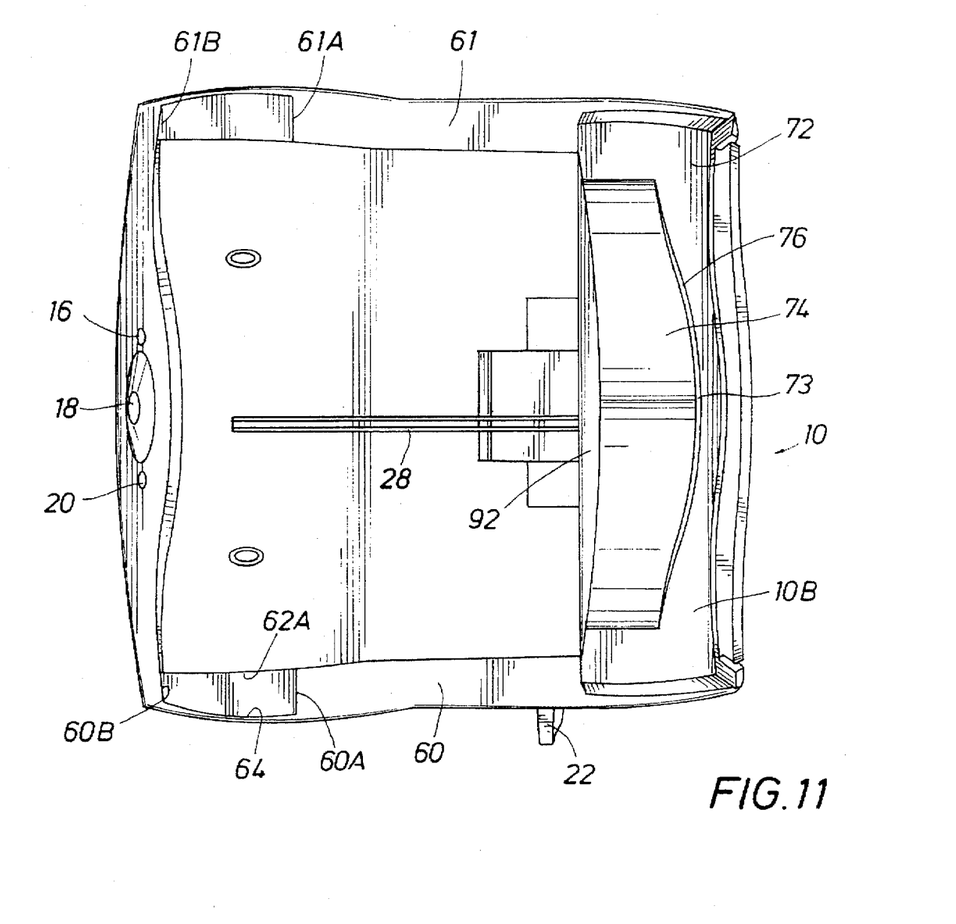
FIG. 11 is a section view taken along line 11—11 of FIG. 8 illustrating a plan view of the docking base with the support member removed.
Figure 12:
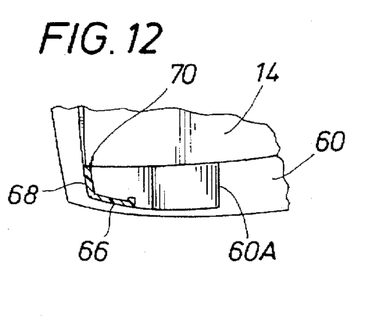
FIG. 12 is a section view taken along line 12—12 of FIG. 10 illustrating the leg of the support member and the blocking surface of the base in the desktop operation position.
Figure 13:
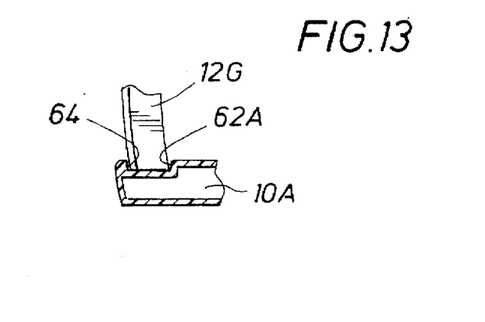
FIG. 13 is a section view taken along line 13—13 of FIG. 10 illustrating the leg of the support member between the slide walls of the base.

Additionally, as can best be seen in FIGS. 10 and 11, the back section 10B of the base presents an inclined stop surface 92 to rest the display section of the portable computer PC against when the portable computer is in the open position to provide access to and use of the keyboard section (not shown). The quick installation and removal of the monitor support member 12 of the present invention facilitates change of the portable computer between the open position for use of the keyboard section and the closed position for the docked desktop operation position.

As best shown in FIG. 14, the bottom of the support member 12 is fabricated from a honeycomb structural members 94 fabricated only from the preferred plastic, as described above, to increase the structural stability of the support member 12 without the use of metal reenforcement members.

METHOD OF USE

The system of the present invention provides a method for quick installation and removal of support member 12 on an inclined docking base 10 for a portable computer PC. In particular, a portable computer PC (with the portable computer display section in the closed position) is docked on the top surface 14 of the inclined docking base 10.

Turning to FIG. 8, the front surface of the legs 12 and 12G of the support member 12 are positioned on the base 10 in the initial slide position at 61A and 60A, respectively. The support member 12 then is slid in the direction of the front section 10A of the base 10 until the legs, guided by slide walls, engage their respective blocking surfaces 61B, 60B. Upon engagement of the legs with their respective blocking surfaces, the shoulder 78A of the coupling member 78 of the support member 12 is also aligned and engaged with the shoulder 76 of the bell curved shaped coupling member 74 of the back section 10B of the base 10. The slide walls and blocking surface for each leg in combination with the coupling members 12 resist movement of the support member 12 relative to the base 10. The weight of the computer monitor M and the textured surfaces enhances the engagement of the support member 12 with the base 10. This system is designed to safely support a monitor weighing up to 55 pounds.

Therefore, a docking base 10 with an inclined top surface 14 that facilitates quick installation and removal of a monitor support member 12 is provided. This inclined docking base 10 with a self-aligning monitor support member uses the force of gravity to both position and engage the support member 12 with the base 10 while providing access to the front and both sides of the portable computer PC, when docked. When the support member 12 is removed, the docking base 10 further provides a desirable 150° resting support 92 for the display section of the portable computer PC when use of the keyboard section of the portable computer PC is desired.

Advantageously, the present invention provides rearward sliding movement of the support member 12 relative the base 10 by the user for removing the support member. However, the weight of the monitor M in combination with support member 12 resist rearward movement when the system is in the desktop operation position, as shown in FIG. 1.

The foregoing disclosure and description of the invention are illustrative and explanatory thereof, and various changes in the size details of the illustrated apparatus and construction and method of operation may be made without departing from the spirit of the invention.

We claim:

1. System adapted for use with a portable computer, comprising:
    a base having a front section and a back section, said front section having a top surface adapted to receive the portable computer and said back section having a top surface including a coupling member that extends above said back section top surface;
    slides disposed on said front section top surface and sloping downwardly from the direction of the back section to the front section;
    a support member having a top and a bottom for being removably positioned on said base;
    legs extending from said bottom of said support member, each leg adapted to be received on one of said slides; and
    a support member coupling member positioned on said bottom of said support member and being aligned with said base back section coupling member when said legs are moved from an initial sliding position to a desktop operation position.

2. System of claim 1, wherein said front section top surface inclines downwardly when said base is placed on a horizontal surface.

3. System of claim 1 wherein said base back section coupling member is bell curve shaped to facilitate positioning with the support member coupling member.

4. System of claim 1 further comprising:
    a shoulder disposed in said base for defining said front section and said back section; and
    an electrical connector disposed in said shoulder to connect with the portable computer.

5. System of claim 1 wherein one slide is disposed on one side of said base and ends adjacent to the front of said front section top surface and another slide is disposed on the other side of said base and ends adjacent to the front of said front section top surface.

6. System of claim 1 wherein each slide being enclosed on three sides to provide support to its respective leg wherein said coupling members, said legs and said slides, when installed, provide a quick removal of the support member upon rearward sliding movement of said support member relative to said base.

7. System of claim 2 further comprising said base having a bottom surface, wherein when said bottom surface is positioned on the horizontal surface and said support member is positioned on said base, said top of said support member is substantially parallel to the horizontal surface.

8. System of claim 7 wherein said coupling members resist movement of said support member relative to said base.

9. System of claim 1 further comprising slide walls on each side of said slides, wherein said legs and said slide walls resist movement of said support member relative to said base.

10. System of claim 9 further comprising a computer monitor, wherein the weight of said monitor positioned on the top of said support member enhances the engagement of said support member to said base.

11. System of claim 10 wherein said support member is capable of safely supporting a monitor that weighs 55 pounds.

12. System of claim 1 further comprising structural members fabricated from plastic on said support member.

13. Computer system adapted for use with a docking base having a top surface and a coupling member, wherein the top surface of the docking base inclines downwardly, comprising:
    a support member having a body including a top, a bottom, a front and a back and adapted for removable positioning on the docking base,
    a plurality of legs extending from said front and bottom of said support member body; and
    a support member coupling member being recessed in said bottom of said support member and adapted to engage the coupling member of the base when installed to provide a quick release of the support member upon rearward sliding movement of said support member relative to said base.

14. System of claim 13 wherein when said support member is positioned on said base, said top of said support member is substantially parallel to the horizontal surface.

15. System of claim 13 wherein said legs are C-shaped to resist movement of said support member relative to said base.

16. System of claim 14 further comprising a computer monitor, wherein the weight of said monitor positioned on the top of said support member enhances the engagement of said support member to said base.

17. System of claim 13 further comprising structural members fabricated from plastic on the bottom of said support member.

18. Method for installing a support member on a docking base having a portable computer; comprising the steps of:

positioning the base having a front section and a back section on a substantially horizontal surface, said front section having a top surface adapted to receive the portable computer and said back section having a top surface including a coupling member that extends above said back section top surface, slides disposed on said front section top surface slope downwardly from the direction of the back section to the front section;

positioning the legs extending from the bottom of the support member on the respective slides on the front section of the base; and sliding the legs of the support member down the slides until movement of the legs is blocked by front blocking surfaces so that each leg is enclosed on three sides to align the support member coupling member with the base coupling member.

19. Method of claim 18 further comprising the step of:

horizontally positioning a base of a computer monitor on the top of said support member even though the front section top surface of said base inclines relative to a horizontal surface on which the base is positioned.

20. Method of claim 18 further comprising the step of:

removing the support member by rearward sliding movement of said support member relative to said base.

* * * * *